W. T. DONNELLY.
FLOATING DRY DOCK.
APPLICATION FILED JUNE 20, 1908.
920,284.
Patented May 4, 1909.
5 SHEETS—SHEET 3.
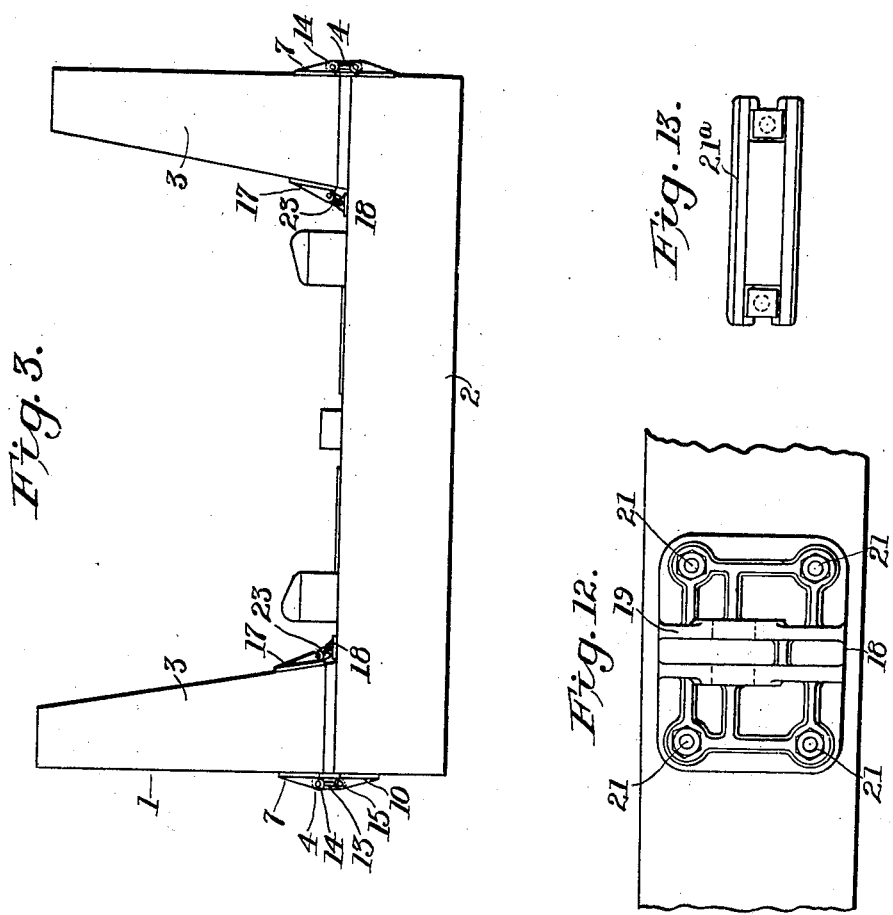

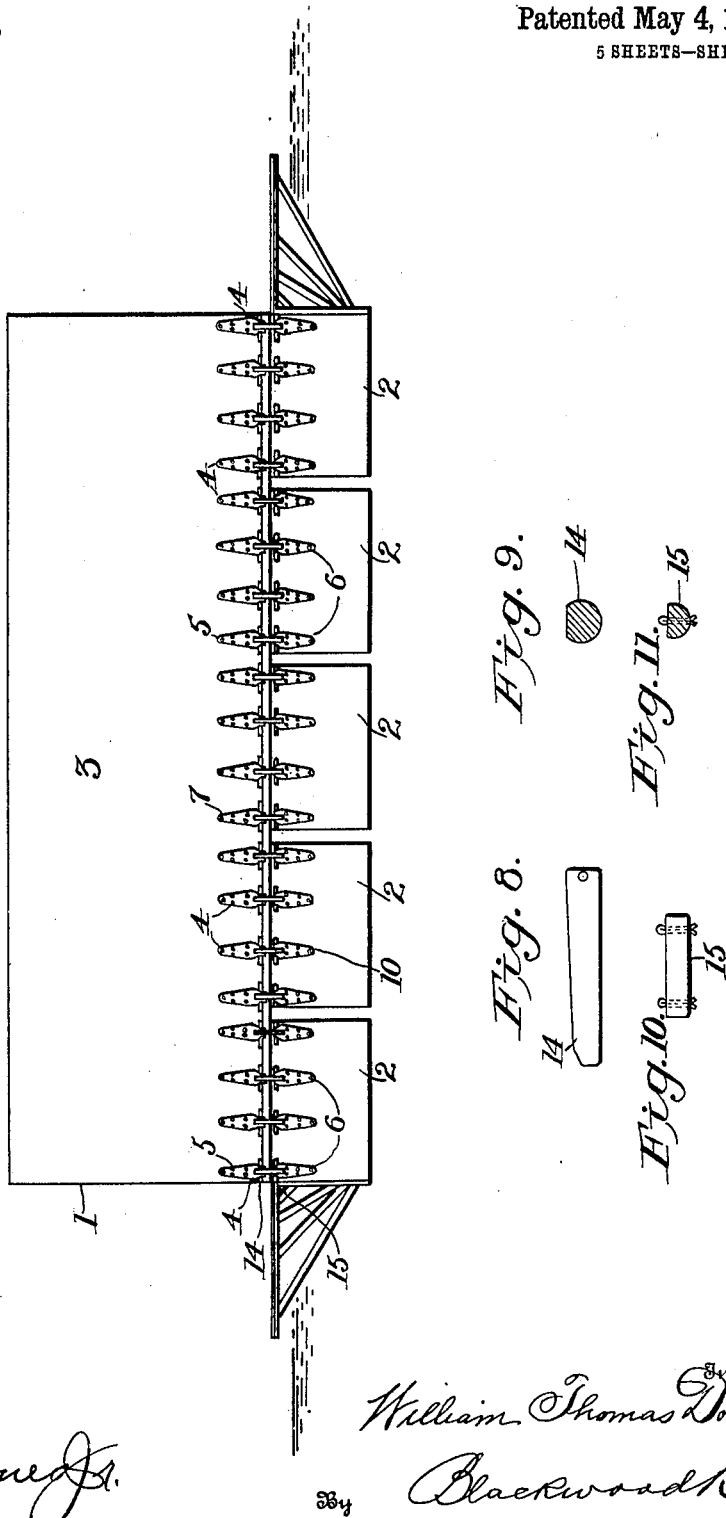

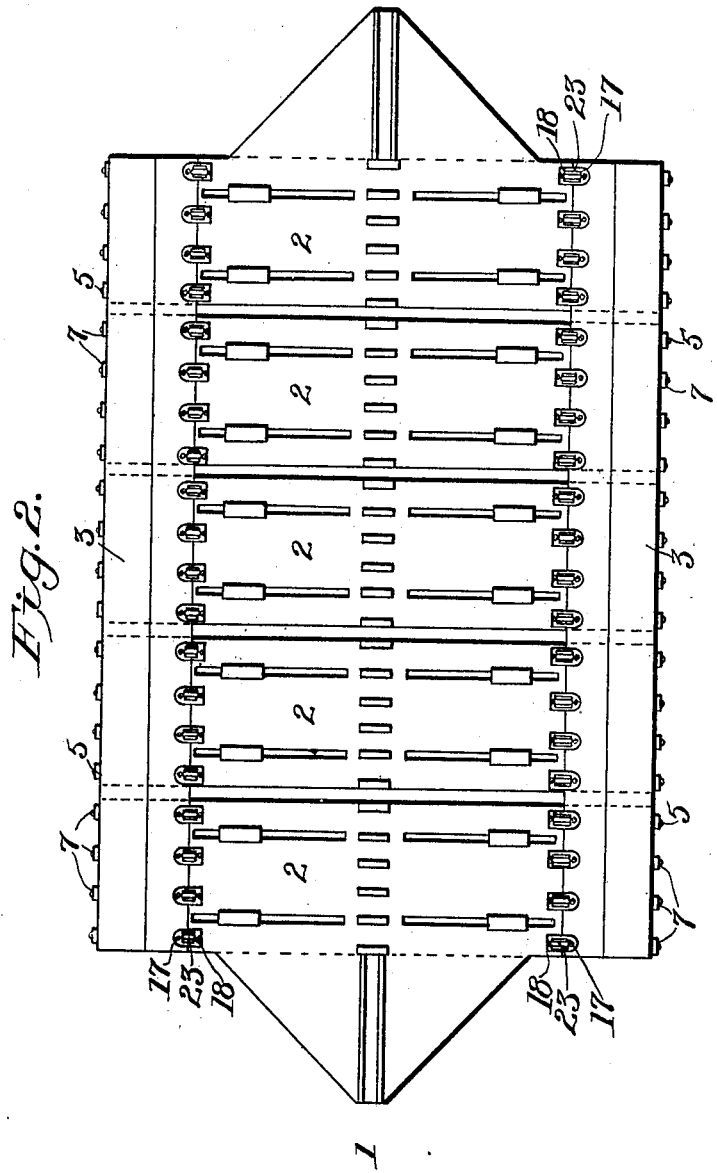

W. T. DONNELLY.
FLOATING DRY DOCK.
APPLICATION FILED JUNE 20, 1908.
920,284.
Patented May 4, 1909.
5 SHEETS—SHEET 4.
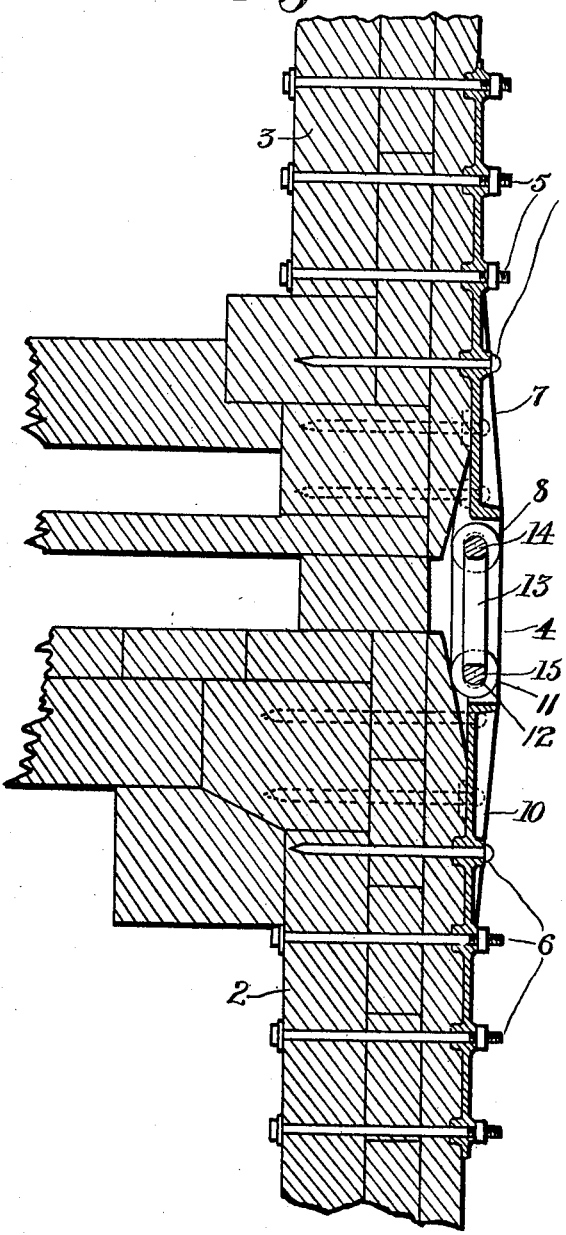
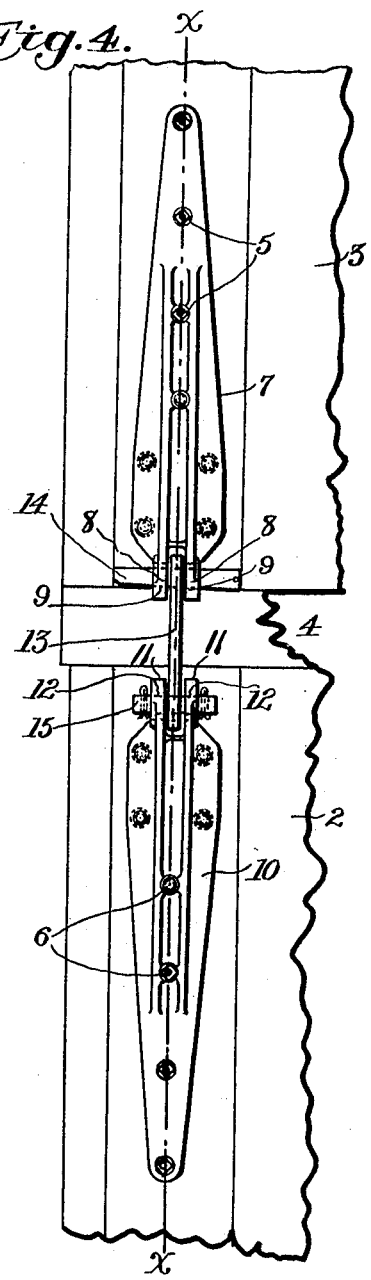
Witnesses
Inventor
William Thomas Donnelly
By Blackwood Bros.
Attorneys W. T. DONNELLY.
FLOATING DRY DOCK.
APPLICATION FILED JUNE 20, 1908.
920,284.
Patented May 4, 1909.
5 SHEETS—SHEET 5.
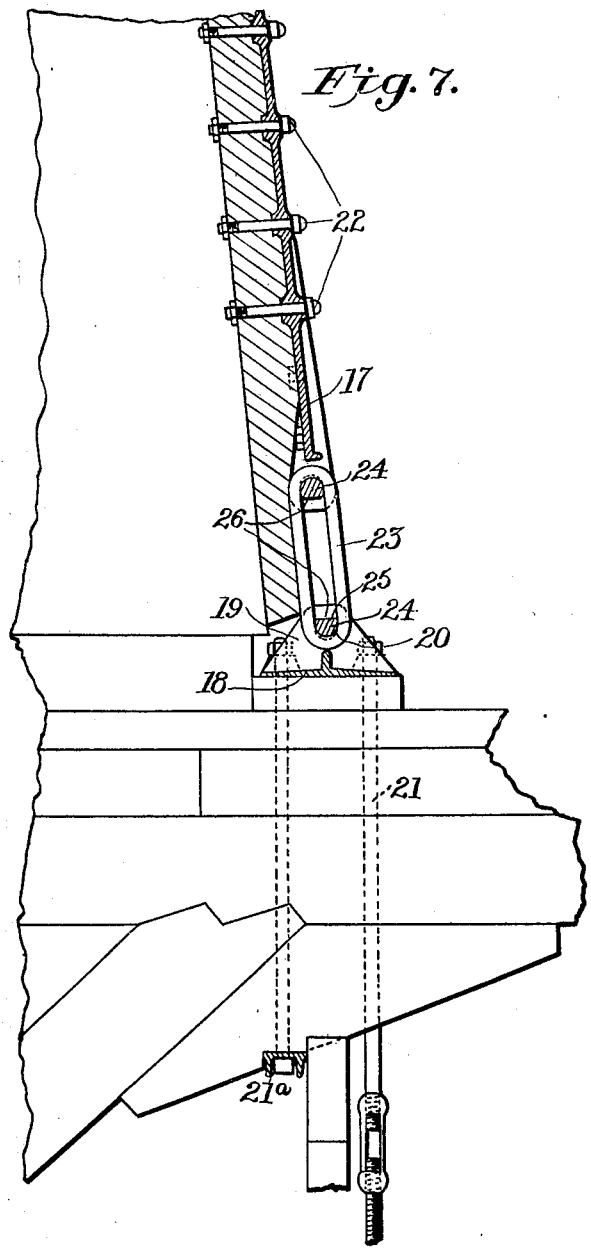
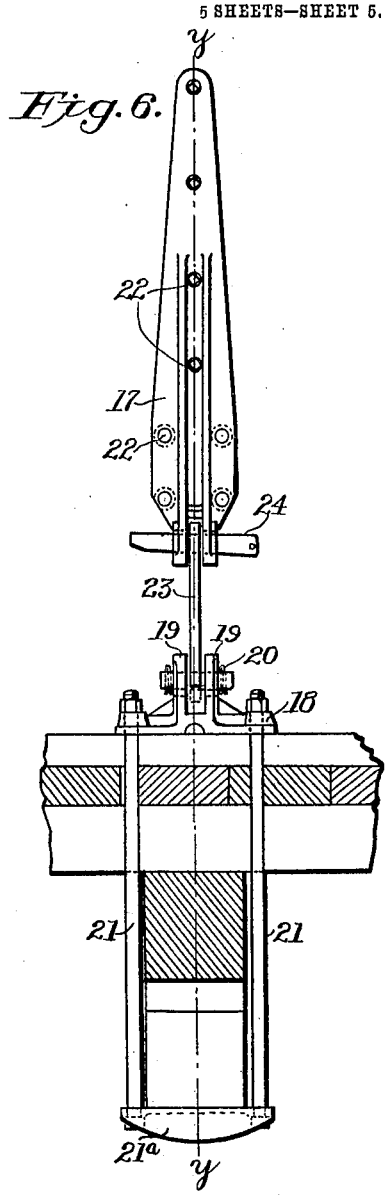
Inventor
William Thomas Donnelly
By Blackwood Bros.
Attorneys
Witnesses

UNITED STATES PATENT OFFICE.

WILLIAM THOMAS DONNELLY, OF BROOKLYN, NEW YORK.

FLOATING DRY-DOCK.

No. 920,284.    Specification of Letters Patent.    Patented May 4, 1909.

Application filed June 20, 1908. Serial No. 439,484.

*To all whom it may concern:*

Be it known that I, WILLIAM THOMAS DONNELLY, a citizen of the United States, residing at Brooklyn, in the county of Kings and State of New York, have invented certain new and useful Improvements in Floating Dry-Docks, of which the following is a specification.

My invention relates to improvements in floating dry-docks and more especially to means for coupling the pontoons of such docks to the sides or wings thereof.

Great difficulty has been experienced heretofore in providing a coupling for connecting the pontoons, especially those of large dimensions, to the sides or wings of floating dry-docks on account of the expansion of the sides and wings due to the heat of the sun, while the floating pontoons, almost totally submerged in water are of the same temperature as the water. It has been the practice to connect the pontoons to the side walls or wings with closely fitting machine bolts which require extremely accurate work and which, when subjected to atmospheric and sea water conditions, soon become so corroded that they are absolutely unsatisfactory if not useless. When the nuts of these bolts become corroded, it is often impossible to remove them without twisting off the ends of the bolts or otherwise mutilating or destroying them.

The object of the invention is to provide a coupling for connecting the pontoons and sides or wings of a floating dry dock, which is simple, inexpensive and durable in construction, and which will not be affected by exposure to the weather or sea water.

It further has for its object to provide a coupling which will allow a limited relative displacement of the pontoons and the sides or wings in any direction.

In all forms of floating dry-docks it is necessary to provide some means of self-docking for the purpose of allowing repairs and examinations to be made and this requires that the structure shall be made up of a number of independent parts, pontoons or sections, mechanically connected together. The fact that the dock must go out of commission or remain idle while repairs or examinations are being carried on, clearly demonstrates the fact that all the connections between the several parts should be of the simplest and most practical form and capable of being detached and assembled in the very shortest possible time and with the most simple tools and appliances. I therefore provide means whereby one or more of the pontoons may be readily and easily removed within an exceedingly short space of time and replaced by a new one, or the same pontoon replaced after being repaired.

Referring to the drawings:—Figure 1, is a side view in elevation of a floating dry dock with my invention applied thereto. Fig. 2, a top plan view. Fig. 3, an end view. Fig. 4, is a detail front view of one of the couplings used on the outer walls of the wings or sides, on an enlarged scale, and a portion of a pontoon and side of a dock. Fig. 5, is a section on the line x—x of Fig. 4. Fig. 6, is a detail front view of one of the couplings used on the inner walls of the sides or wings and a portion of a pontoon and side of a dock. Fig. 7, is a section on the line y—y of Fig. 6. Figs. 8 and 9, detail views of one of the wedges. Figs. 10 and 11, detail views of one of the pins. Fig. 12 a top view of the lower portion of one of the couplings used on the inner walls of the sides or wings. Fig. 13, a bottom plan view of one of the shoes.

In the drawing in which like numerals of reference denote like parts throughout the several views: 1 represents a floating dry-dock having a series of pontoons 2 and sides or wings 3. A series of couplings 4 arranged at regular intervals along the outer walls of the sides or wings of the dock and the end walls of the pontoons, are secured to the said sides or wings and the pontoon by means of bolts 5 and 6 respectively. Each of the said couplings comprises an upper plate or member 7 having circular shaped lugs 8 with eyes 9 therethrough and a lower plate 10 arranged along the end walls of the pontoons and in alinement with the upper plates or members 7, and having lugs 11 with eyes 12 therethrough. The plates or members 7 and 10 are pivotally connected together by means of links 13, tapering wedges 14 and pins 15.

The wedge 14 being inserted and driven into the eyes 9 of the plate 7 and through the upper end of the link 13 and the pins 15 being inserted and driven into the eyes 12 of the plates 10 and through the lower end of the links and having cotter pins inserted through each side of the plates 10, the pontoons and sides or wings will be held securely in place. The working angle or taper of the wedges is made the same as the angle of the screwthread of a screw bolt that would be used for the same purpose.

The couplings used to connect the inner walls of the wings or sides and the pontoons vary somewhat from those used to connect the outer walls of the wings or sides and the pontoons; that is, the upper plates or members 17 are similar, but the lower plates or members are different, as they comprise horizontal plates 18 provided with vertical lugs 19 having eyes 20 therethrough.

The plates 18 are secured to the pontoons by means of suitable bolts 21 and plates or shoes 21ª and the plates or members 17 are secured to the sides or wings by means of bolts 22. Links 23 connect the plates or members 17 and 18 and 24 are pins which are inserted and driven into the eyes of the plates or members 17 and 18 and through the links and have cotter pins inserted through them on each side of the links 23. It will be noticed that the several eyes of the plates or members each have a flat portion 25, and that the wedges and pins each have a flat portion 26 to engage the flat portions of the eyes.

The only tool required to connect or disconnect the couplings is a hammer or mallet with which to drive the wedges.

I do not desire to be understood as limiting myself to the specific details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variations and modifications as properly fall within the scope of my invention and the terms of the following claims.

What I claim is:—

1. In a floating dry-dock, pontoons, sides or wings mounted on top thereof, eyes on said pontoons and sides or wings, links, and pins designed to engage said eyes and links and connect said links to the pontoons and sides or wings, substantially as described.

2. In a floating dry-dock, pontoons, sides or wings mounted on top thereof, eyes on each side of said sides or wings, eyes on said pontoons, links, and pins designed to engage said eyes and links and connect said links to the pontoon and sides or wings, substantially as described.

3. In a floating dry dock, pontoons and sides or wings each having eyes thereon provided with a flat portion, wedges or pins having flat portions to engage the flat portions of the said eyes, substantially as described.

4. In a floating dry-dock, pontoons and sides or wings each having eyes thereon, links, and wedge-shaped pins designed to engage said eyes and links and connect said links to the pontoons and sides or wings, substantially as described.

5. In a floating dry dock, pontoons and sides or wings each having plates secured thereto which are provided with lugs having eyes, links and tapering pins designed to engage said eyes and links and couple said pontoons and sides or wings together substantially as described.

6. In a floating dry-dock, pontoons and sides or wings each having plates secured thereto which are provided with lugs having eyes therethrough with flattened portions, links, and pins with flattened portions designed to be inserted in said eyes and links and engage the flattened portions of said eyes, substantially as described.

In testimony whereof I have signed my name in the presence of two subscribing witnesses.

WILLIAM THOMAS DONNELLY.

Witnesses:
 WM. H. ZANTZINGER,
 A. L. ANDERSON.